United States Patent
Chamala et al.

(10) Patent No.: US 11,397,816 B2
(45) Date of Patent: Jul. 26, 2022

(54) AUTHENTICATED BOOT TO PROTECT STORAGE SYSTEM DATA BY RESTRICTING IMAGE DEPLOYMENT

(71) Applicant: EMC IP HOLDING COMPANY LLC, Hopkinton, MA (US)

(72) Inventors: Sindhura Chamala, Bangalore (IN); Kannan Subbaraman, Bangalore (IN); Venkat Mattapalli Reddy, Bangalore (IN); Debra Robitaille, Hopkinton, MA (US); Mark Arakelian, Shirley, MA (US)

(73) Assignee: Dell Products L.P., Hopkinton, MA (US)

( * ) Notice: Subject to any disclaimer, the term of this patent is extended or adjusted under 35 U.S.C. 154(b) by 239 days.

(21) Appl. No.: 16/504,575

(22) Filed: Jul. 8, 2019

(65) Prior Publication Data

US 2021/0012010 A1 Jan. 14, 2021

(51) Int. Cl.
*H04L 29/06* (2006.01)
*G06F 21/57* (2013.01)
*G06F 21/60* (2013.01)

(52) U.S. Cl.
CPC .......... *G06F 21/575* (2013.01); *G06F 21/602* (2013.01); *G06F 2221/034* (2013.01)

(58) Field of Classification Search
CPC . G06F 21/575; G06F 21/602; G06F 2221/034
See application file for complete search history.

(56) References Cited

U.S. PATENT DOCUMENTS

| | | | |
|---|---|---|---|
| 9,189,609 B1* | 11/2015 | Antony | G06F 9/45558 |
| 2005/0083749 A1* | 4/2005 | Keohane | H04L 67/34 |
| | | | 365/222 |
| 2007/0192466 A1* | 8/2007 | Nahum | G06F 9/4416 |
| | | | 709/223 |
| 2010/0217964 A1* | 8/2010 | Peterka | G01R 31/31719 |
| | | | 713/185 |
| 2012/0179904 A1* | 7/2012 | Dunn | G06F 21/575 |
| | | | 713/155 |
| 2012/0210115 A1* | 8/2012 | Park | H04L 9/3247 |
| | | | 713/2 |
| 2018/0069852 A1* | 3/2018 | Buendgen | G06F 9/4416 |
| 2018/0089438 A1* | 3/2018 | Oh | G06F 21/577 |
| 2018/0211016 A1* | 7/2018 | Mikhailov | G06F 21/12 |
| 2019/0095221 A1* | 3/2019 | Zhan | G06F 9/4408 |
| 2019/0340385 A1* | 11/2019 | Alsina | G06F 16/27 |

* cited by examiner

*Primary Examiner* — Taghi T Arani
*Assistant Examiner* — Lin Chang
(74) *Attorney, Agent, or Firm* — Anderson Gorecki LLP

(57) ABSTRACT

A boot image is modified to require authentication based on stable system values that are uniquely associated with a storage array. The stable system values may be used as a key to decrypt a password. The modified boot image will not allow booting to proceed without the decrypted password. The password cannot be decrypted based on different stable system values such as the stable system values of other storage arrays.

6 Claims, 3 Drawing Sheets

AUTHENTICATED BOOT TO PROTECT STORAGE SYSTEM DATA BY RESTRICTING IMAGE DEPLOYMENT

TECHNICAL FIELD

The subject matter of this disclosure is generally related to storage arrays that maintain large active data sets, and more particularly to preventing unauthorized deployment of storage array boot images.

BACKGROUND

Large organizations use data centers to maintain their critical data. For example, banks, large retailers, and multinational corporations rely on data centers to store data associated with inventory, accounting, sales, manufacturing, and other critical functions for which data loss must be avoided and data availability must be maintained. Storage arrays are key building blocks of a data center. Storage arrays manage access to large active data sets that are concurrently used by multiple host applications and potentially many users. The host application data is stored on non-volatile managed drives such as SSDs (solid-state drives) and HDDs (hard disk drives). Each storage array includes redundant computing nodes that manage access to the drives. Pairs of computing nodes are configured for failover and provide multiple network data paths. The managed drives may be configured into RAID (Redundant Array of Independent Drives) protection groups to improve data availability and avoid data loss in the event of drive failure.

A boot image includes the diagnostic and operating system code that is used to boot a computer hardware platform such as a storage array. Boot images may be created and stored to facilitate operations that require the hardware platform to be rebooted. Although the boot image may not include the host application data that is maintained by the storage array, a boot image from one storage array can be used to boot a different storage array. Creation of multiple copies of a storage array or other hardware platform with a common boot image can be problematic.

SUMMARY

All examples, aspects and features mentioned in this document can be combined in any technically possible way.

In accordance with some aspects an apparatus comprises: a storage array comprising a plurality of interconnected computing nodes that manage access to a plurality of data storage drives; and a boot image generator that creates a modified boot image for the storage array, the modified boot image comprising authentication code that performs authentication on an attempted boot using a value that is uniquely associated with the storage array. In some implementations the value comprises a combination of stable system values. In some implementations each of the stable system values is selected from the group comprising: a UUID (universally unique identifier), storage array serial number, MAC address, and guest container name. In some implementations the stable system values are persistently stored by the storage array, do not change, and, either alone or in combination, are uniquely associated with the storage array. In some implementations the stable system values are combined via concatenation. In some implementations concatenated stable system values are hashed. In some implementations a portion of the hash is used as a key. In some implementations the key provides access to a password. In some implementations the modified boot image uses the stable system values to generate the key to obtain the password. In some implementations the modified boot image performs authentication based on the password.

In accordance with some aspects a method comprises: creating a modified boot image for a storage array, comprising: retrieving a value that is uniquely associated with the storage array; and inserting authentication code into a boot image for the storage array, the authentication code performing authentication on an attempted boot using the value. In some implementations the value is a stable system value and the method comprises retrieving and combining a plurality of stable system values. Some implementations comprise combining the stable system values via concatenation. Some implementations comprise hashing the concatenated stable system values. Some implementations comprise using a portion of the hash as a key. Some implementations comprise encrypting a password with the key and inserting the encrypted password in the modified boot image. Some implementations comprise, in response to an attempted boot from the modified boot image, retrieving the stable system values from the storage array. Some implementations comprise generating the key from the stable system values in response to an attempted boot from the modified boot image. Some implementations comprise decrypting the password with the key and using the password for authentication.

In accordance with some aspects a method comprises: in response to an attempt to boot a hardware platform with a modified boot image: obtaining a plurality of stable system values from the hardware platform; combining the stable system values to generate a value that is uniquely associated with the hardware platform; and using the value that is uniquely associated with the hardware platform to authenticate the boot attempt.

Other aspects, features, and implementations may become apparent in view of the detailed description and figures.

DETAILED DESCRIPTION

Aspects of the inventive concepts will be described as being implemented in a data storage system that includes a host server and storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "storage array" and "solid-state drive" are intended to include all storage nodes and storage components in which the inventive concepts may be implemented. The terms "logical" and "virtual" are used to refer to features that are abstractions of other features, e.g. and without limitation abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory computer-readable medium and implemented by multipurpose tangible processors, and any combinations thereof.

Figure 1:
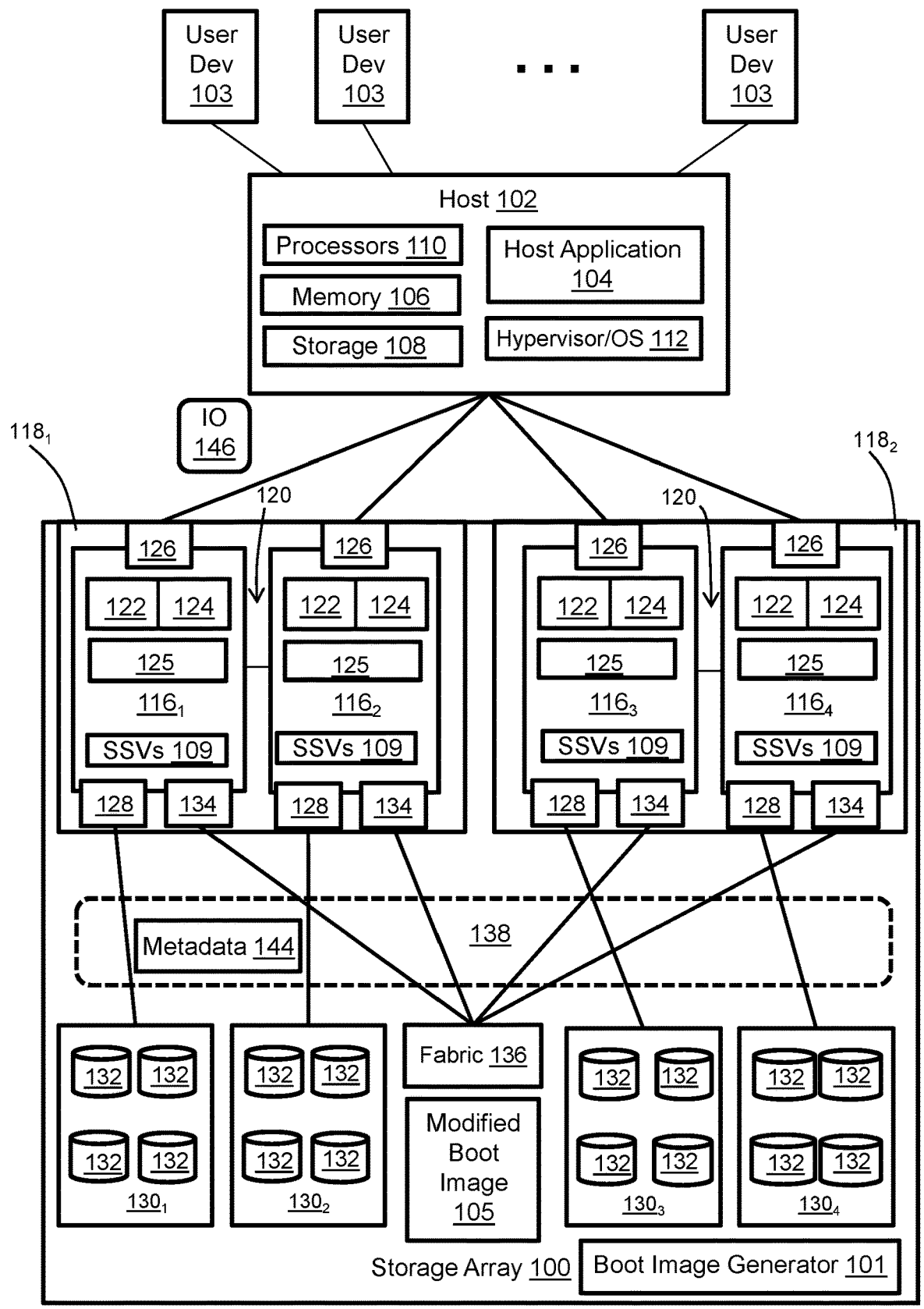
FIG. 1 illustrates a storage array with a boot image generator that uses stable system values to generate a modified boot image.

FIG. 1 illustrates a storage array 100 with a boot image generator 101 that uses stable system values 109 for generation of a modified boot image 105. The storage array is shown in a simplified data center that includes a host 102. There would typically be multiple hosts per storage array and multiple storage arrays in the data center, but the example is simplified to facilitate illustration of salient aspects. Each of the hosts that are connected to the storage array, of which host 102 is representative, may support multiple user devices 103. Host 102 may be a type of server computer that includes volatile memory 106, non-volatile storage 108, one or more tangible processors 110, and a hypervisor or OS (Operating System) 112. The volatile memory 106 may include RAM (Random Access Memory) of any type. The non-volatile storage 108 may include drives of one or more technology types, for example, and without limitation, SSDs (Solid State Drives) such as flash, and HDDs (Hard Disk Drives) such as SATA (Serial Advanced Technology Attachment) and FC (Fibre Channel). Although an external host server is illustrated, internal hosts may be instantiated within the storage array.

The storage array 100 includes a plurality of interconnected computing nodes $116_1$-$116_4$ that maintain data on, and control access to, managed drives 132. Each computing node includes at least one multi-core processor 122 and local volatile memory 125. The computing nodes may also include one or more layers of cache. The local volatile memory 125 may include, for example and without limitation, components such as RAM of any type. Each computing node may also include one or more FAs 126 (Front-end Adapters) for communicating with the host 102. Each computing node $116_1$-$116_4$ may also include one or more BAs 128 (Back-end Adapters) for communicating with the managed drives 132 in drive array enclosures $130_1$-$130_4$. The managed drives 132 may include tangible persistent data storage components of one or more technology types, for example, and without limitation, SSDs such as flash and SCM (Storage Class Memory), and HDDs such as SATA and FC. Each drive array would typically include 24 or more managed drives, but the figure is simplified for purposes of illustration. Because the storage array and/or data center may include hundreds or thousands of individual drives, systemic problems associated with drives can be logistically problematic. Each computing node may also include one or more CAs (Channel Adapters) 134 for communicating with other computing nodes via an interconnecting fabric 136. Each computing node may allocate a portion or partition of its respective local volatile memory 125 to a virtual shared memory 138 that can be accessed by other computing nodes, e.g. via DMA (Direct Memory Access) or RDMA (Remote Direct Memory Access). Pairs of the computing nodes, e.g. ($116_1$, $116_2$) and ($116_3$, $116_4$), may be organized as storage engines $118_1$, $118_2$, respectively, for purposes of failover between computing nodes. The paired computing nodes of each storage engine may be directly interconnected by communication links 120.

One function of the storage array 100 is to maintain data for instances of a host application 104 running on the host 102. Specifically, host application data is maintained on the managed drives 132. Examples of host applications may include but are not limited to file servers, email servers, block servers, and databases. The managed drives 132 are not discoverable by the host 102 but the storage array 100 maintains a logical production device 140 that can be discovered and accessed by the host 102. Without limitation, the production device 140 may be referred to as a production volume or production LUN, where LUN (Logical Unit Number) is a number used to identify the logical storage volume in accordance with the SCSI (Small Computer System Interface) protocol. From the perspective of the host 102, the production device 140 is a single data storage device having a set of contiguous fixed-size LBAs (logical block addresses) on which data used by instances of the host application resides. However, the host application data is stored at non-contiguous addresses on various different managed drives 132 that are abstracted by the production volume.

In order to service IOs from instances of the host application 104, the storage array 100 maintains metadata 144 that indicates, among various things, mappings between LBAs of the production device 140 and addresses with which extents of host application data can be accessed from the shared memory 138 and managed drives 132. In response to a data access instruction from an instance of the host application 104, the hypervisor/OS 112 initially determines whether the instruction can be serviced by accessing the host server memory 106. If that is not possible then an IO 146 is sent from the host 102 to the storage array 100. There are multiple paths between the host 102 and the storage array 100, e.g. one path per FA 126. The paths may be selected based on a wide variety of techniques and algorithms including, for context and without limitation, performance and load balancing. In the case of an IO to read data from the production device the storage array uses the metadata 144 to find the requested data in the shared memory 138 or managed drives 132. More particularly, if the requested data is not in the shared memory 138 then the requested data is temporarily copied into the shared memory from the managed drives 132 and used to service the IO, i.e. reply to the host application with the data via one of the computing nodes. In the case of an IO to write data to the production device the storage array copies the data into shared memory, marks the corresponding production device location as dirty in the metadata, and creates new metadata that maps the production device address with a location to which the data is eventually written on the managed drives. The shared memory may enable the production device to be reachable via all the computing nodes and paths, although the storage array can be configured to limit use of certain paths to certain production devices.

The storage array may include a variety of stable system values 109. Stable system values are data values that are persistently stored by the storage array, do not change, and, either alone or in combination, are uniquely associated with the individual storage array on which they are persistently stored. Moreover, the stable system values can be retrieved from the storage array by the computing nodes. Examples may include but are not limited to UUIDs (universally unique identifiers), serial numbers, MAC addresses, and names of structures such as containers. As will be explained in greater detail below, the boot image generator 101 uses the stable system values 109 to generate the modified boot image 105 and the modified boot image later uses the stable system values 109 for boot authentication. Consequently, unauthorized booting of a different storage array with the modified boot image may be prevented.

Figure 2:
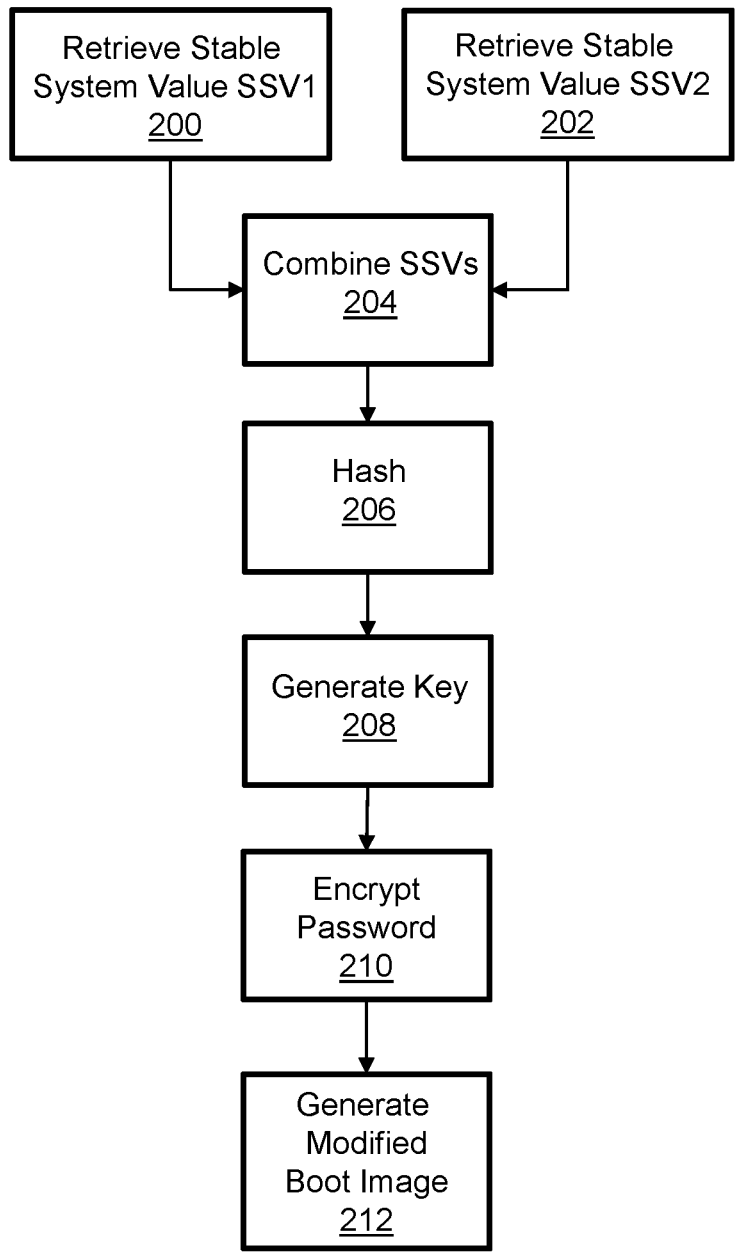
FIG. 2 illustrates operation of the boot image generator.

FIG. 2 illustrates operation of the boot image generator 101 (FIG. 1). The boot image generator uses one or more stable system values to generate a modified boot image. Steps 200, 202 are to retrieve first and second different stable system values, SSV1, SSV2, respectively. The stable system values may be unique to the storage array, either alone or in combination. In other words, a stable system value may be uniquely associated with an individual storage array, or the stable system value may be non-uniquely associated with the storage array if it can be combined with another stable system value to generate a combination that is uniquely associated with the individual storage array. Although retrieval of two stable system values is shown in the illustrated example, any number of stable system values could be used. Step 204 is to combine the retrieved stable system values. The stable system values may be combined in a wide variety of ways, possibly including but not limited to concatenation and various arithmetic and Boolean operations. Step 206 is to generate a hash of the combined stable system values. Step 208 is to generate a key from the hash. Step 210 is to encrypt a verification password. The verification password is encrypted such that the key generated in step 208 can be used to decrypt the verification password. Step 212 is to generate a modified boot image with the password. The modified boot image includes the encrypted password, e.g. in a lock box. Further, the modified boot image includes code that requires recovery or presentation of the unencrypted password for boot authentication. The modified boot image will not allow the platform on which it is loaded to complete booting without successfully authenticating the platform with the password.

Figure 3:
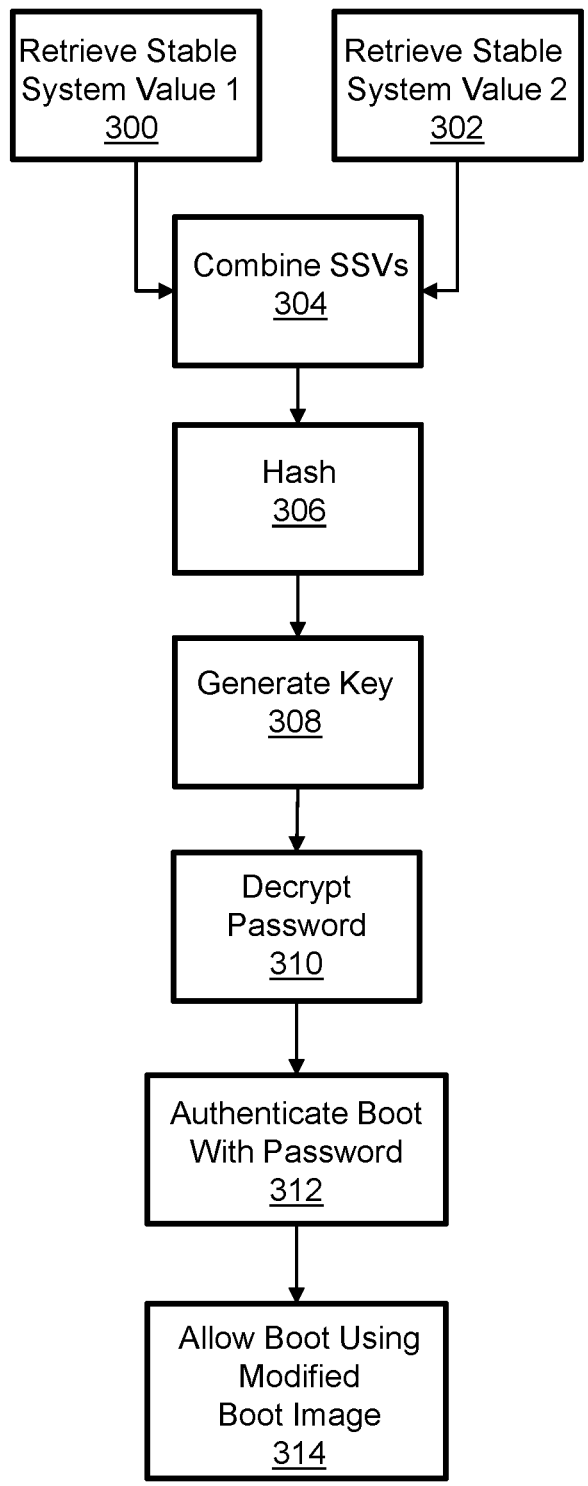
FIG. 3 illustrates operation of the modified boot image.

FIG. 3 illustrates operation of the modified boot image 105 (FIG. 1). The modified boot image obtains the password to enable booting from the modified boot image by retrieving and using the same stable system values used by the boot image generator to generate the modified boot image. Steps 300, 302 are to retrieve the first and second stable system values, (SSV1, SSV2), respectively, from the storage array. This may include reading the stable system values from ROM and/or non-volatile storage. Step 304 is to combine the retrieved stable system values. The stable system values may be combined in the same way that the stable system values were combined to generate the key by the boot image generator. Step 306 is to generate a hash of the combined stable system values. The same hash function used by the boot image generator is used. Step 308 is to generate a key from the hash. Step 310 is to use the key to decrypt the verification password that is maintained in the lockbox of the modified boot image. Step 312 is to authenticate the boot attempt with the decrypted password. As indicated in step 314, authentication enables the boot attempt to proceed using the modified boot image. In the absence of authentication, the modified boot image will prevent the boot attempt from proceeding. Thus, if the modified boot image is loaded on a different storage array the authentication and thus boot will fail because the stable system values will differ, so the password will not be decrypted. However, a copy of the password may be stored outside the storage array and used to boot a different storage array with the modified boot image. Consequently, it is not necessary to manually input the password to reboot the storage array with which the password is originally associated.

For context and without limitation, after a storage array is installed with an unmodified boot image, that boot image may be modified by appending a guest container name or UUID to the serial number of the storage array, hashing the result, and then using the first fifteen (or any other number) of characters of the hash as a lock box decryption key. For example:

```
SSN: 000197900133
Guest Container Name: MGMT-0
echo-n "000197900133MGMT-0" | openssl dgst-sha256
(stdin) = 1760af3024f7015820203566b9096d00016b8cfcb82627f9860f28c5ae37c7c
Key: 61760af3024f701
```

The modified boot image may be built with a lockbox library to protect the key. The modified boot image uses APIs to generate the key and retrieve the password from the lockbox.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
a storage array comprising:
  a plurality of interconnected computing nodes that manage access to a plurality of data storage drives;
  a boot image generator that creates a modified boot image for the storage array by retrieving stable system values, combining the stable system values via concatenation to generate concatenated stable system values, hashing the concatenated stable system values to generate a hash value that is uniquely associated with the storage array, using a portion of the hash value as a key to encrypt a password, and inserting the encrypted password into a boot image for the storage array; and
authentication code that performs authentication on an attempted boot from the modified boot image by retrieving the stable system values from the storage array, using the retrieved stable system values to generate the key, using the key to decrypt the encrypted password, and using the decrypted password to authenticate the attempted boot.

2. The apparatus of claim 1 wherein each of the stable system values is selected from the group comprising: a UUID (universally unique identifier), storage array serial number, MAC address, and guest container name.

3. The apparatus of claim 1 wherein the stable system values are persistently stored by the storage array, do not change, and, either alone or in combination, are uniquely associated with the storage array.

4. A method comprising:
with a storage array:
- creating a modified boot image for the storage array by retrieving stable system values and combining the retrieved stable system values via concatenation to generate concatenated stable system values;
- hashing the concatenated stable system values to generate a hash value that is uniquely associated with the storage array;
- using a portion of the hash value as a key to encrypt a password;
- inserting authentication code comprising the encrypted password into a boot image for the storage array; and
- in response to an attempted boot from the modified boot image, the authentication code performing authentication on the attempted boot using the value by retrieving the stable system values from the storage array.

5. The method of claim 4 comprising generating the key from the stable system values in response to an attempted boot from the modified boot image.

6. The method of claim 5 comprising decrypting the password with the key and using the password for authentication.

* * * * *